US010628407B1

(12) United States Patent
Sosothikul et al.

(10) Patent No.: US 10,628,407 B1
(45) Date of Patent: Apr. 21, 2020

(54) EFFICIENT MULTITHREADED DATA STRUCTURE PROCESSING

(71) Applicant: Amazon Technologies, Inc., Seattle, WA (US)

(72) Inventors: Sroaj Sosothikul, Seattle, WA (US); Yonatan Reuven Fogel, Seattle, WA (US); Dumanshu Goyal, Seattle, WA (US); Erben Mo, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 487 days.

(21) Appl. No.: 15/444,150

(22) Filed: Feb. 27, 2017

(51) Int. Cl.
| G06F 16/20 | (2019.01) |
| G06F 16/23 | (2019.01) |
| G06F 16/215 | (2019.01) |
| G06F 16/22 | (2019.01) |
| G06F 12/02 | (2006.01) |
| G06F 12/0808 | (2016.01) |

(52) U.S. Cl.
CPC ...... *G06F 16/2365* (2019.01); *G06F 12/0269* (2013.01); *G06F 12/0276* (2013.01); *G06F 12/0808* (2013.01); *G06F 16/215* (2019.01); *G06F 16/2246* (2019.01)

(58) Field of Classification Search
CPC ............... G06F 16/2365; G06F 16/215; G06F 16/2246; G06F 12/0269; G06F 12/0276; G06F 12/0808
USPC ........................................................ 707/690
See application file for complete search history.

(56) References Cited

U.S. PATENT DOCUMENTS

| 5,506,967 | A  | * | 4/1996  | Barajas    | G06F 12/0808 |
|           |    |   |         |            | 711/113      |
| 9,112,818 | B1 | * | 8/2015  | Arad       | H04L 49/90   |
| 10,140,208| B2 | * | 11/2018 | Printezis  | G06F 12/0269 |
| 2005/0132374 | A1 | * | 6/2005 | Flood    | G06F 12/0276 |
|           |    |   |         |            | 718/100      |
| 2005/0198079 | A1 | * | 9/2005 | Heeb     | G06F 8/443   |
|           |    |   |         |            | 707/999.2    |
| 2008/0082471 | A1 | * | 4/2008 | Shacham  | G06F 17/11   |
|           |    |   |         |            | 706/45       |
| 2009/0043631 | A1 | * | 2/2009 | Finlayson | G06Q 10/06  |
|           |    |   |         |            | 705/7.17     |
| 2011/0078696 | A1 | * | 3/2011 | Blackburn | G06F 9/4881 |
|           |    |   |         |            | 711/147      |
| 2012/0254267 | A1 | * | 10/2012 | Printezis | G06F 12/0269 |
|           |    |   |         |            | 707/818      |
| 2014/0380319 | A1 | * | 12/2014 | Haverkamp | G06F 9/4881 |
|           |    |   |         |            | 718/102      |

(Continued)

OTHER PUBLICATIONS

MongoDB, "Validate," Reference Definition, Database Commands, retrieved on Oct. 30, 2017, from https://docs.mongodb.com/manual/reference/command/validate/, 3 pages.

(Continued)

*Primary Examiner* — Vincent F Boccio

(74) *Attorney, Agent, or Firm* — Davis Wright Tremaine LLP

(57) ABSTRACT

A computing resource service provider implements a verification engine for hierarchical data structures. The verification engine uses a work item queue, a node allocation counter list, and a memory deallocation list to increase parallelism and thread utilization during verification operations involving ordered, nominally sorted data structures.

20 Claims, 9 Drawing Sheets

(56) References Cited

U.S. PATENT DOCUMENTS

2017/0060924 A1* 3/2017 Fitzhardinge ....... G06F 16/2246

OTHER PUBLICATIONS

Wikipedia, "B-tree," Wikipedia Encyclopedia, retrieved on Oct. 30, 2017, from https://en.wikipedia.org/wiki/B-tree, 13 pages.

* cited by examiner

US 10,628,407 B1

EFFICIENT MULTITHREADED DATA STRUCTURE PROCESSING

BACKGROUND

The scope, complexity, and scale of computing resource utilization continue to increase at a seemingly exponential rate. The complexity and scale of data generated by such computing resource usage is likewise increasing, and various schemes, such as database management systems, have been implemented to organize data so as to allow for timely manipulation, location, and verification of data elements.

As a result of the increasing complexity of both the data and schemes used to manage the data, verification processes for data structures used to organize, index, and catalog large quantities of data are increasingly relying on distributed or otherwise parallel computation. However, the hierarchical nature of many data structures used to organize large collections of data poses difficulties for scheduling, coordinating, and balancing disparate parallel workers in a distributed system, especially if the data structure being verified is unbalanced at the time of verification. Furthermore, in existing verification schemes, the level of parallelism achieved may be limited by the actual structure of the hierarchy, which can be problematically inefficient if the data structure is hierarchically deep.

BRIEF DESCRIPTION OF THE DRAWINGS

Various techniques will be described with reference to the drawings, in which.

DETAILED DESCRIPTION

Figure 1:
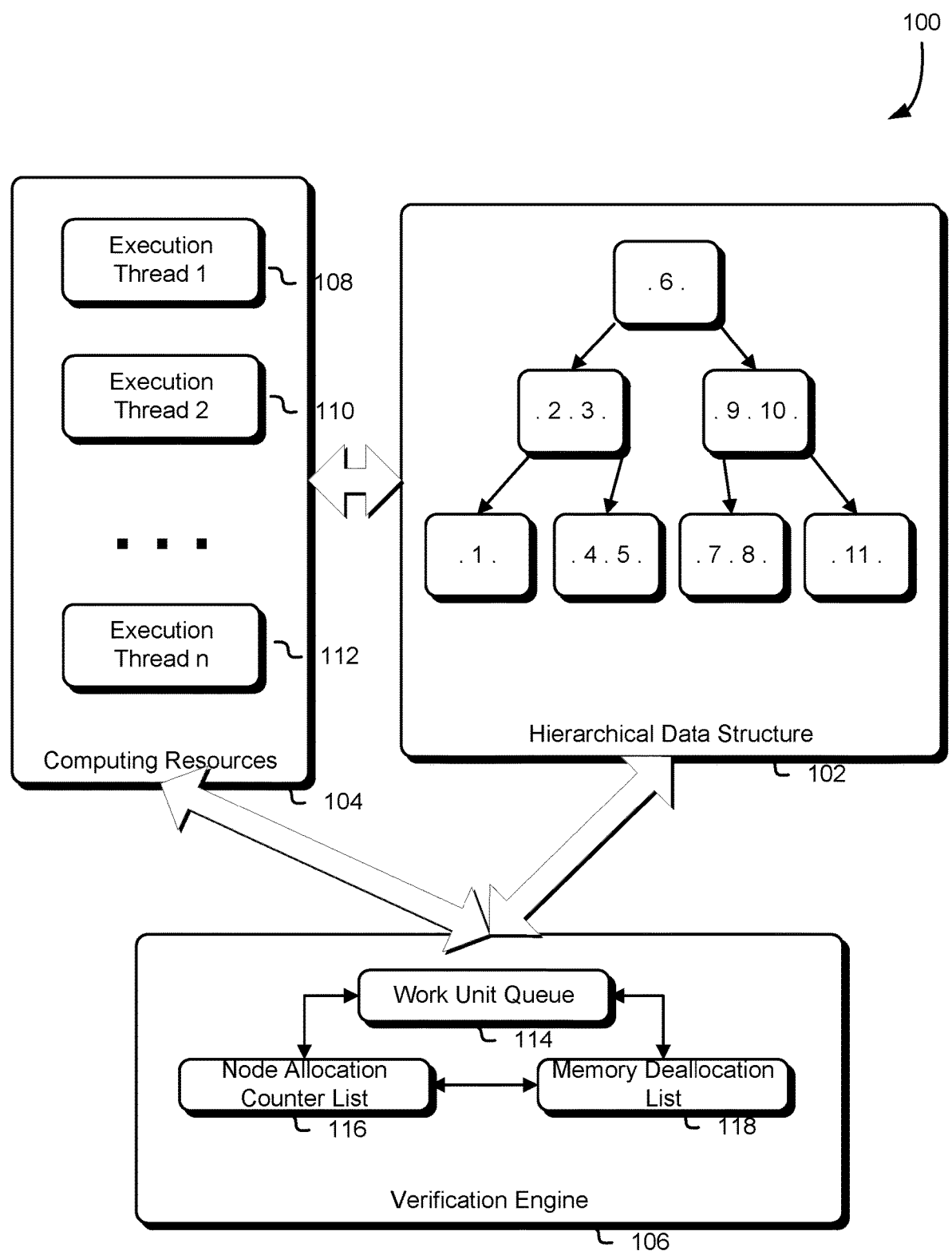
FIG. 1 illustrates an example implementation of a verification engine utilizing computing resources to verify or otherwise interact with a hierarchical data structure, in accordance with one embodiment.

Hierarchical data structures, such as B-trees, B+-trees, B*-trees, order statistic trees, binary search trees, and variants thereof, are verified using techniques and systems described herein. Such hierarchical data structures are implemented to store, organize, and/or reference data, either locally to the structure or separately therefrom. In one embodiment, one or more hierarchical data structures is implemented by a database management service to organize and represent data objects (e.g., database objects) stored on a data storage of the database management service.

In one embodiment, a computing resource service provider provides a plurality of computing resources, portions of which are instantiated into a plurality of execution threads available to a verification engine for performing the verification techniques described herein. The verification engine is, in one embodiment, a component or service implemented by the computing resources of the computing resource service provider. In one embodiment, the verification engine communicates with the database management service via an interface of the database management service so as to interact with the hierarchical data structure. In one embodiment, the verification engine is an implemented function of a data storage engine of the database management service, where the data storage engine implements and maintains the hierarchical data structure.

In one embodiment, the hierarchical data structure is a series of nodes arranged in a hierarchical order, where a given node can only directly depend from and otherwise relate to one other node. As may be appreciated, such hierarchical data structures have, at the top level of the hierarchy, a single root node, from which one or more child nodes depend. In some cases, the hierarchical data structure has multiple levels of hierarchy, where one or more child nodes depend from a given higher level child node. Child nodes without further nodes dependent therefrom are referred to as leaf nodes.

In one embodiment, the nodes of the hierarchical data structure contain keys or other data stored by a component of a database management service, such as a database engine. Such keys or other data refer, in an embodiment, to data (e.g., data objects), stored separately from the hierarchical data structure, such as in data storage of the database management service, via a separate data storage service or device, and/or the like. In one embodiment, the data in the nodes is the data stored and represented by the database engine. In one embodiment, the nodes contain a combination of references to remote data locations and directly stored data. In one embodiment, a given node contains a plurality of keys and/or data elements. In one embodiment, where the structure is a B-tree or related type, the number of keys and/or data elements is bounded in quantity (minimum, maximum, or both) at least by a predetermined Knuth order of the structure as a whole. In one embodiment, the nodes are internally ordered with respect to the key values contained within, as well as constrained by the characteristics of the parent node from which it/they depend.

In one embodiment, the verification engine initiates a verification process by instantiating a first execution thread to locate a root node of the hierarchical data structure. The first execution thread generates a work item identifying the root node and adds it to a work item queue implemented by or for the verification engine, such as by the computing resource service provider. The work item includes, in one embodiment, the entirety of the data in the node, a pointer or other reference to the location of the node within the data structure (e.g., in data storage, or relative to the structure itself), or some combination thereof. The work item queue is, in one embodiment, bounded to a maximum size.

The verification engine then causes an execution thread to retrieve the work item at the backmost location of the queue (e.g., the next item ready for retrieval from the queue). If the work item associated with the root node is the only item in the queue, in one embodiment, the same execution thread that created the work item also retrieves it from the queue. In one embodiment, any available (e.g., idle) execution thread of the computing resources retrieves the next work item in the queue, regardless its provenance.

The verification engine then causes the execution thread to verify the key or other data in the associated node. In one embodiment, the verification of the node data (e.g., the key) includes retrieving the associated data object from the data storage and verifying the integrity of the data object. In one embodiment, the verification of the node data includes verifying that the key corresponds with the retrieved data.

In one embodiment, verification of the node data includes determining a bounding range for key values within the node and verifying that the key values are within the bounding range. Additionally, the node keys are checked for correct ordering (e.g., sequential, reverse sequential, etc.). For the root node, in one embodiment, the bounding range has an inclusive minimum value of zero and an exclusive maximum value of infinity (or the equivalent maximum value of the primitive type used to represent the maximum value of the range).

The verification engine then causes the execution thread to determine whether the node under verification has any child nodes dependent therefrom. If no child is determined, the execution thread completes verification of the work item and terminate. However, if one or more child nodes are determined, the execution thread generates a work item for each determined child node in the manner previously described. Additionally, the bounding range determined for the parent node is used, along with the key values of the node, to calculated bounding ranges for each of the child nodes. In one embodiment, where the hierarchical data structure is a B-tree, if the root node (having a bounding range from zero (inclusive) to infinity (exclusive), a "leftmost" child node depending from that tree inherits a bounding range of zero (inclusive) to the lowest key value within the parent node (exclusive). Likewise, the "rightmost" child inherits a bounding range corresponding to the largest key value in the parent node (inclusive minimum) to infinity (exclusive maximum). Additionally, any in-between child nodes inherit bounding ranges corresponding to the values of the intervening keys in a similar fashion. In one embodiment, all bounding ranges are bounded by a minimum value that is inclusive and a maximum value that is exclusive, and adjacent child nodes depending from the same parent node effectively use the exclusive maximum value associated with the bounding range for the immediately leftward node as an inclusive minimum (and, accordingly, the inclusive minimum value associated with the bounding range for the immediately rightward node as the exclusive minimum). In one embodiment, these determined bounding ranges are added to the respective work item for the child node to which they apply.

The verification engine then causes the execution thread to determine whether the queue limit and occupancy would allow the thread to add all generated work items to the queue. If the current queue occupancy plus the size of the generated work items does not exceed the queue limit, the execution thread adds all generated work items to the queue in reverse sequential order of the key values of the associated nodes and terminates, thus freeing that execution thread to perform a new iteration of the verification process by retrieving a new work item from the queue and repeating the aforementioned verification steps. However, if the queue cannot accommodate the new work items, the execution thread begins verification of the work items in forward sequential order, using the same verification process. After completed processing of one of these "local" work items, the execution thread reattempts enqueuing of the remaining work items, again in reverse sequential order. If the attempt is successful, the execution thread terminates, but if it is not, it begins processing the next work item in forward sequential order, and again reattempts enqueuing of the remaining work items in reverse sequential order after processing that work item. This reattempt and fallback logic repeats until either the work items are queued or all pending work items have been processed by the instant execution thread.

As may be contemplated, depending on the number of execution threads, the bounded capacity of the queue, and the size/depth of the tree, a practically unbounded number of execution threads can participate in generating and enqueuing the work items by quickly traversing the tree, and similarly, the verification of the resultant work items may be performed in a highly parallel manner. The aforementioned techniques also provide a distinct advantage in thread usage efficiency by preventing deadlocks when the queue is full or otherwise is in a state where the number of work items added to the queue exceeds the rate at which the work items are being removed. The addition of the work items determined and generated by the execution thread in reverse sequential order also increases locality of verification of related nodes (e.g., a given set of execution threads verifies related branches of the tree rather than verifying the nodes in an arbitrary order), thereby reducing the memory needed for holding parent data, as well as removing dwell time of the held data in that memory.

In one embodiment, the verification engine implements and maintains a node allocation counter list and a memory deallocation list to more efficiently track dependencies between nodes and associated data held in memory during verification. During the verification process previously described, the data being verified for a given node is paged in to memory accessible to the execution thread performing the page-in and verification. In one embodiment, data associated with child nodes dependent therefrom also have dependencies on the data associated with the parent node. Accordingly, when a child node is being verified, data associated with its parent remains in memory until the child node data is evicted from memory (e.g., when verification is complete and no further child nodes have associated data also paged in).

In one embodiment, during the verification process, a given execution thread sets a counter to a value (e.g., 1) associated with the node being verified while verifying the data (e.g., placing it into memory). Also during processing of the node, the execution thread increments the counter for that node by one for each child node determined to depend directly therefrom. When the verification of the node data is complete, the counter is decremented by one. Similarly, when verification of each child node is complete, the counter for the parent node is also decremented by one (e.g., by the execution thread performing the processing of the child node). When the counter reaches zero, the execution thread last responsible for decrementing the parent node counter to zero flags the parent node data for eviction from memory by the execution thread that originally paged it into memory. The various counters for the nodes are tracked and maintained by a node allocation counter list implemented by the verification engine. Similarly, nodes flagged for eviction from memory are tracked in a memory deallocation list maintained by the verification engine.

As may be contemplated, for multiple levels of child nodes, data associated with a higher level child node (or root node, for that matter) will remain in memory until all directly and indirectly dependent child nodes below it have been verified. As such, the verification techniques previously mentioned, by virtue of increasing the locality of node verification over time for a given set of execution threads, the length of time the higher level node data stays paged in decreases commensurately. This benefit is compounded by the overall improvement, relative to existing multithreaded techniques, in speed, efficiency, and parallelism of verifying hierarchical data structures using the described techniques.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example implementation 100 of a verification engine utilizing computing resources to verify or otherwise interact with a hierarchical data structure, in accordance with one embodiment.

A verification engine 106 is implemented, such as by a computing resource service provider, to utilize computing resources 104 to verify the integrity of a hierarchical data structure 102. The hierarchical data structure 102 is implemented to store, organize, and/or reference data, either locally to the structure or separately therefrom. In one embodiment, one or more hierarchical data structures is implemented by a database management service, described in further detail below, to organize and represent data objects (e.g., database objects) stored on a data storage of the database management service. In one embodiment, the hierarchical data structure 102 is a tree data structure, such as a B-tree, B+-tree, B*-tree, order statistic tree, binary search tree, or a variant thereof, and is implemented and maintained using one or more instructions stored in memory of a computing resource, such as a computer system, of a database management service and/or system.

In one embodiment, the hierarchical data structure 102 is a series of nodes arranged in a hierarchical order, where a given node can only directly depend from one other node. As may be appreciated, such hierarchical data structures have, at the top level of the hierarchy, a single root node, from which one or more child nodes depend. In some cases, the hierarchical data structure has multiple levels of hierarchy, where one or more child nodes depend from a given higher level child node. Child nodes without further nodes dependent therefrom are referred to as leaf nodes.

In one embodiment, the nodes of the hierarchical data structure 102 contain keys or other data stored by a component of a database management service, such as a database engine. Such keys or other data refer, in one embodiment, to data (e.g., data objects), stored separately from the hierarchical data structure 102, such as in data storage of the database management service, via a separate data storage service or device, and/or the like. In one embodiment, the data in the nodes is the data stored and represented by the database engine. In one embodiment, the nodes contain a combination of references to remote data locations and directly stored data. In one embodiment, a given node contains a plurality of keys and/or data elements. In one embodiment, where the structure is a B-tree or related type, the number of keys and/or data elements is bounded in quantity (minimum, maximum, or both) at least by a predetermined Knuth order of the structure as a whole. In one embodiment, the nodes are internally ordered with respect to the key values contained within, as well as constrained by the characteristics of the parent node from which it/they depend.

In one embodiment, a computing resource service provider provides a plurality of computing resources 104, portions of which are instantiated into a plurality of execution threads 108, 110, 112 available to the verification engine 106 for performing the verification techniques described in further detail herein. The computing resources 104 include, in one embodiment, one or more computer systems and other resources, such as data storage devices, network interfaces, and the like. In one embodiment, the physical, "bare metal" resources are abstracted into one or more virtual computer systems (e.g., virtual machine instances), having access to a portion of the various computing resources 104. The computing resources 104 include one or more processors, data storage devices such as solid state drives and hard disk drives, random-access memory, and in one embodiment, such resources 104 may be flexibly assigned to the various execution threads 108, 110, 112. Conversely, each execution thread 108, 110, 112 has access to a portion of the overall pool of computing resources 104, such as a portion of the memory, disk storage, processor capability (e.g., core count), etc. In one embodiment, the execution threads 108, 110, 112 are logically isolated from each other and operate independently.

The verification engine 106 is, in one embodiment, a component or service implemented by a computing resource service provider. In one embodiment, the verification engine 106 communicates with a database management service via an interface of the database management service so as to interact with the hierarchical data structure 102. In one embodiment, the verification engine interacts with the execution threads 108, 110, 112 so as to cause (e.g., coordinate) the threads to perform the verification techniques on the hierarchical data structure 102, as described in further detail herein. In one embodiment, the verification engine 106 is an implemented function of a data storage engine of the database management service, where the data storage engine implements and maintains the hierarchical data structure 102.

In one embodiment, the verification engine 106 implements and maintains a node allocation counter list 116, a memory deallocation list 118, and a work unit queue 114 to coordinate and effectuate verification routines, performed by the execution threads 108, 110, 112, on the hierarchical data structure 102. Some or all of the components of the verification engine 106, i.e., the work unit queue 114, the node allocation counter list 116, and the memory deallocation list 118, are, in one embodiment, implemented using computing resources of the computing resource service provider, such as the computing resources 104 (e.g., drawing from the same pool as the execution threads 108, 110, 112. In one embodiment, the various components of the verification engine are implemented in one or more virtual machine instances running on the computing resources. In one embodiment, the components of the verification engine 106 are implemented as part of a database management system component, such as a data storage engine as described in further detail herein.

The verification engine 106 causes the execution threads 108, 110, 112 to iterate through the nodes of the hierarchical data structure 102 and generate work items from each discovered node. In one embodiment, these generated work items are added to the work unit queue 114 for further processing by one or more available execution threads that dequeue the work units asynchronously relative to the enqueuing thereof. The techniques used to determine, enqueue, process, and dequeue such work items are described in greater detail elsewhere herein.

In one embodiment, the node allocation counter list 116 is implemented to track data dependencies between nodes and, accordingly, enable the execution threads 108, 110, 112 to page in or page out data associated with node verification with less coordination between the various execution threads. The memory deallocation list 118 is implemented to track memory eviction requests for node data that is no longer necessary to keep in memory on a per-thread basis, further increasing the independence with which the various execution threads operate. The specific techniques associated with these components are also described in further detail elsewhere herein.

Figure 2:
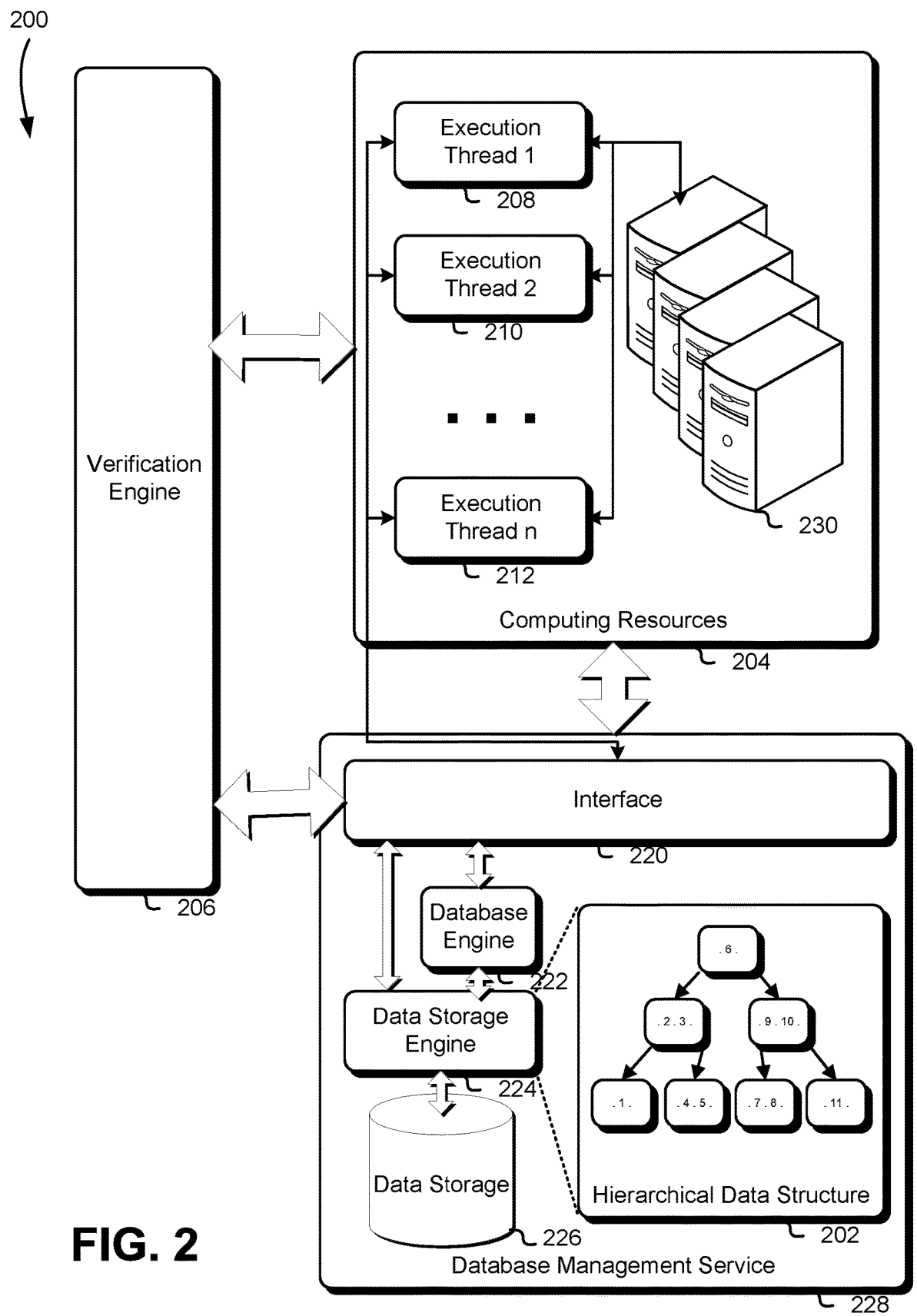
FIG. 2 illustrates an example environment in which a verification engine interacts with components of a database management service to perform verification or other operations on a hierarchical data structure, in accordance with one embodiment.

FIG. 2 illustrates an example environment 200 in which a verification engine interacts with components of a database management service to perform verification or other operations on a hierarchical data structure, in accordance with one embodiment.

Similarly to as mentioned at least in connection with FIG. 1, a verification engine 206 interacts with one or more execution threads 208, 210, 212 instantiated from respective sets of resources 230 of a pool of computing resources, so as to cause the execution threads 208, 210, 212 to interact with a database management service 228 to perform verification functions on a hierarchical data structure 202. The interactions between the verification engine 206 and the database management service 228 (and, likewise, the execution threads 208, 210, 212 and the database management service 228) take place via one or more interfaces 220 of the database management service. In one embodiment, the interface 220 is a programmatic interface, such as an application programming interface (API), a webservice call, or the like.

In one embodiment, the verification engine 206 provides its functionality and routines as an implementation of the database management service 228. The database management service 228 implements a database engine 222 that processes database queries related to the data objects represented in the hierarchical data structure, such as by running the database engine 222 on one or more computing resources, such as within a virtual machine instance of the aforementioned computing resources. The interface 220 receives commands to be passed to the database engine 222 for interpretation and further processing, and the database engine 222 provides responses to the interface 220 return to the requestor. In one embodiment, the interface 220 also provides access to a data storage engine 224, which accepts commands to store and catalog data in an organized fashion on the data storage 226, such as by indexing and maintaining a hierarchical data structure 202 to represent the stored data on the data storage 226. As with the database engine 222, the data storage engine 224 is, in one embodiment, one or more computing resources, such as a virtual machine instance, that implement and maintain a structural overlay for data stored in data storage 226, as well as process database engine 222 commands to retrieve, store, verify, index, etc.

data on the data storage 226 in response to commands received via the interface 220.

In one embodiment, a requestor, such as a device, user, or other entity associated with the computing resources 204 (e.g., a user device in control of the execution threads 208, 210, 212), provides a verification request, e.g., via one of the execution threads, to the database management service via the interface 220. The interface 220 passes the verification command to the data storage engine 224 (optionally via the database engine 222), and the verification process begins in response, such as by the data storage engine or database engine notifying the verification engine to begin the verification task. At this point, the verification engine causes a first execution thread 208 to "bootstrap" the verification process for the hierarchical data structure 202 according to techniques described in further detail herein. As previously mentioned, while the verification engine 206 is illustrated separately from the database management service 228 for the sake of clarity (and may in fact be separate from the database management service 228 in one embodiment), the verification engine 206 is, in one embodiment, implemented by the database management service, rather than separately from it. In one embodiment, the verification request is automatically initiated, such as in response to an alarm (e.g., regarding compromised integrity or other consistency of the hierarchical data structure), on a periodic or ad hoc schedule, etc.

Figure 3:
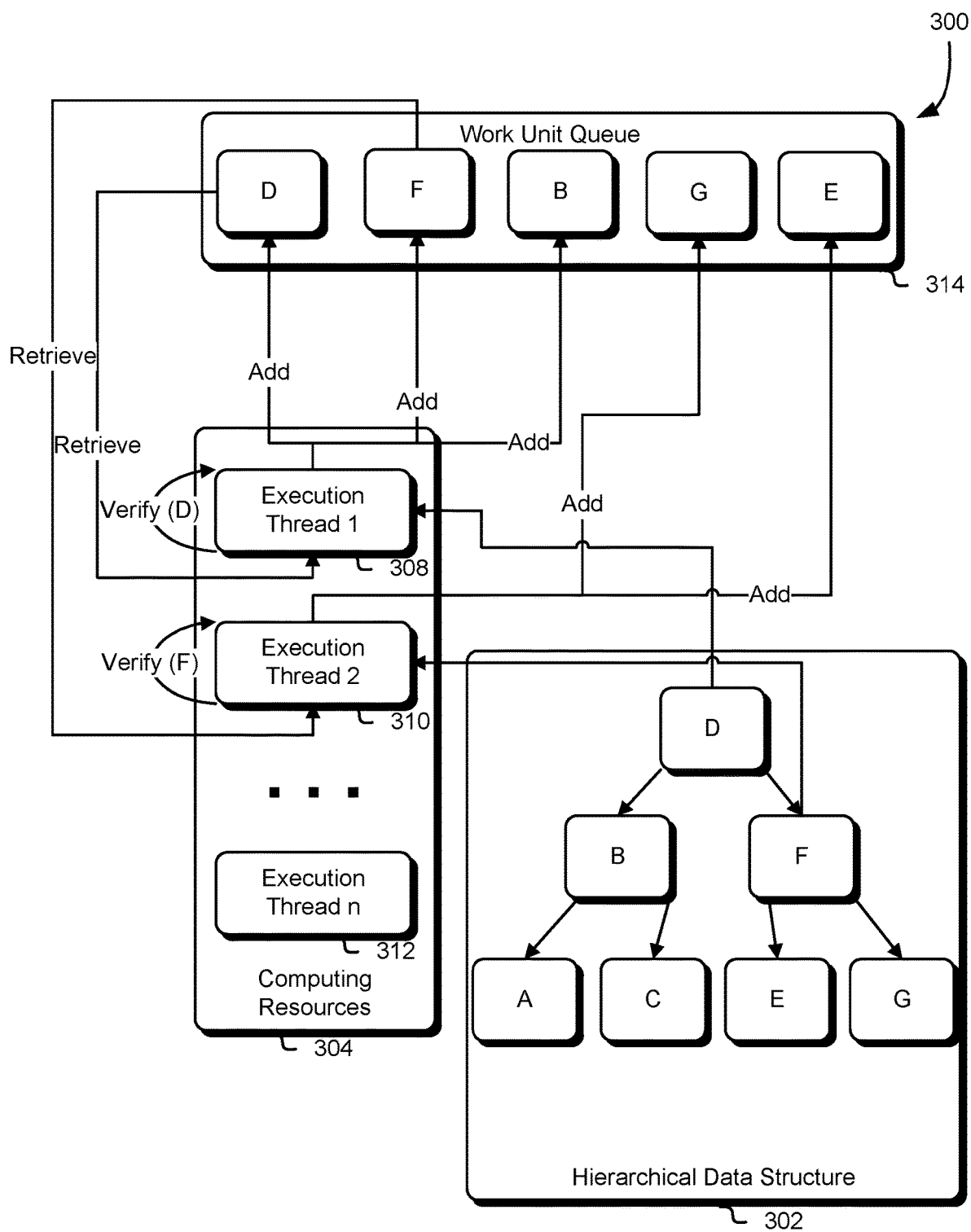
FIG. 3 illustrates an example verification mechanism for a hierarchical data structure using a plurality of execution threads interacting with a work unit queue, in accordance with one embodiment.

FIG. 3 illustrates an example verification mechanism 300 for a hierarchical data structure using a plurality of execution threads interacting with a work unit queue, in accordance with one embodiment.

In one embodiment, as previously mentioned, a verification engine initiates a verification process for a hierarchical data structure 302 in response to a verification request by instantiating a first execution thread 308 of a plurality of execution threads 308, 310, 312 associated with a set of computing resources 304. The initial execution thread 308 locates a root node of the hierarchical data structure, illustrated in FIG. 3 as node D (302). The first execution thread 308 generates a work item identifying the root node (denoted as work item D (314) in FIG. 3) and adds it to a work item queue 314 implemented by or for the verification engine, such as by the computing resource service provider, as previously described. The work item includes, in one embodiment, the entirety of the data in the node, a pointer or other reference to the location of the node within the data structure (e.g., in data storage, or relative to the structure itself), or some combination thereof. The work item queue 314 is, in one embodiment, bounded to a maximum size limit, which can be statically determine, adaptive (e.g., in response to changing memory utilization and/or availability), or a combination thereof.

The verification engine then causes an execution thread 308 to retrieve the work item at the backmost location of the queue (e.g., the next item ready for retrieval from the queue). If the work item associated with the root node is the only item in the queue, in one embodiment, the same execution thread that created the work item also retrieves it from the queue (as illustrated). In one embodiment, any available (e.g., idle) execution thread of the computing resources retrieves the next work item in the queue, regardless of its provenance.

The verification engine then causes the execution thread 308 to verify the key or other data in the associated node (illustrated as "Verify (D)"). In one embodiment, the verification of the node data (e.g., the key) includes retrieving the associated data object from the data storage (e.g., data storage 226) and verifying the integrity of the data object. In one embodiment, the verification of the node data includes verifying that the key corresponds with the retrieved data. The associated data may be unstructured data, structured data (e.g., organized as a data object), or a combination thereof.

In one embodiment, verification of the node data includes determining a bounding range for key values within the node and verifying that the key values are within the bounding range. Additionally, the node keys are checked for correct ordering (e.g., sequential, reverse sequential, etc.) against this bounding range. The bounding range is added to the work item to which it applies, such that a different execution thread can verify the key values within the work item independently of needing to access the bounding range definitions of its parent node. The techniques used for determining bounding range are described in further detail elsewhere herein.

The verification engine then causes the execution thread 308 to determine whether the node under verification has any child nodes dependent therefrom. If no child is determined, the execution thread completes verification of the work item and terminate. However, if one or more child nodes are determined (e.g., B and F as illustrated), the execution thread 308 generates a work item for each determined child node in the manner previously described.

The verification engine then causes the execution thread 308 to determine whether the queue limit and occupancy would allow the thread to add all generated work items to the queue. If the current queue occupancy plus the size of the generated work items does not exceed the queue limit, the execution thread adds all generated work items to the queue in reverse sequential order of the key values of the associated nodes and terminates, thus freeing that execution thread to perform a new iteration of the verification process by retrieving a new work item from the queue and repeating the aforementioned verification steps. As illustrated, work items B and F are added in reverse sequential order (e.g., F, then B).

In parallel, a different execution thread 310 retrieves the next work item in the work unit queue 314 (F, as illustrated), and repeats the series of actions just described (verifying F, discovering E and G, and adding G and E, in that order, to the queue 314).

When the queue 314 cannot accommodate all new work items generated by a given execution thread (e.g., execution thread n 312), that execution thread begins verification of the work items it just generated in forward sequential order, using the same verification process described immediately above, without pulling any additional work units from the queue 314. If the execution thread n 312 retrieves work unit B, verifies B, determines A and C, and the queue 314 cannot accommodate both A and C without going over its size limit, execution thread n 312 begins processing work unit A in similar fashion as just described. After completed processing of one of these "local" work items, the execution thread 312 reattempts enqueuing of the remaining work items, again in reverse sequential order. If the attempt is successful, the execution thread terminates, but if it is not, it begins processing the next work item in forward sequential order, and again reattempts enqueuing of the remaining work items in reverse sequential order after processing that work item. This reattempt and fallback logic repeats until either the work items are queued or all pending work items have been processed by the instant execution thread.

As may be contemplated, depending on the number of execution threads, the bounded capacity of the queue, and the size/depth of the tree, a practically unbounded number of execution threads can participate in generating and enqueuing the work items by quickly traversing the tree, and similarly, the verification of the resultant work items may be performed in a highly parallel manner. The aforementioned techniques also provide a distinct advantage in thread usage efficiency by preventing deadlocks when the queue is full or otherwise is in a state where the number of work items added to the queue exceeds the rate at which the work items are being removed. The addition of the work items determined and generated by the execution thread in reverse sequential order also increases locality of verification of related nodes (e.g., a given set of execution threads verifies related branches of the tree rather than verifying the nodes in an arbitrary order), thereby reducing the memory needed for holding parent data, as well as removing dwell time of the held data in that memory.

Figure 4:
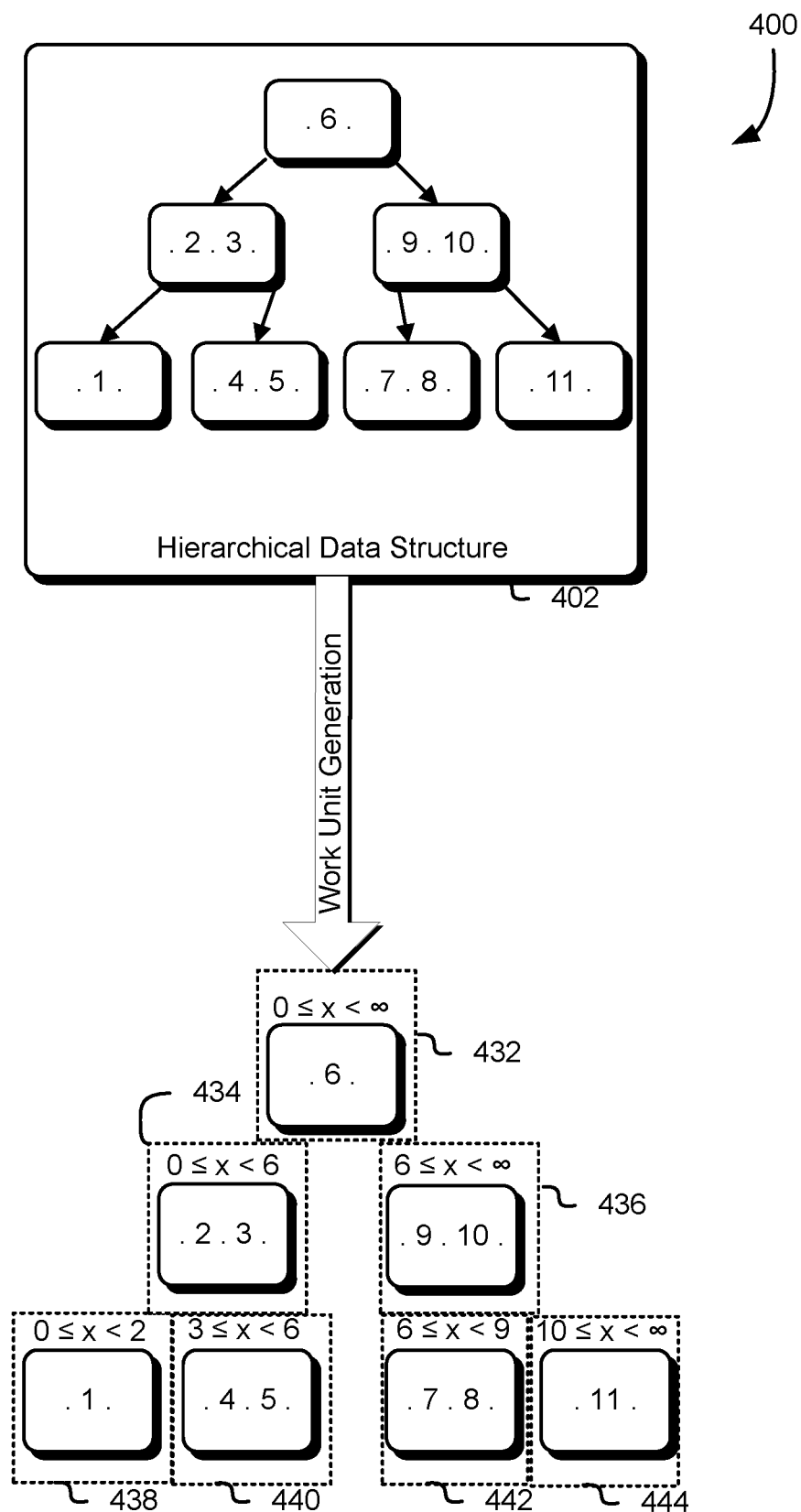
FIG. 4 illustrates an example bounding range determination mechanism as part of work unit generation scheme for nodes of a hierarchical data structure, in accordance with one embodiment.

FIG. 4 illustrates an example bounding range determination mechanism 400 as part of work unit generation scheme for nodes of a hierarchical data structure, in accordance with one embodiment.

In one embodiment, as previously mentioned, verification of the node data of a hierarchical data structure 402 includes determining a bounding range for key values within the node and verifying that the key values are within the bounding range. For the root node, in one embodiment, the bounding range has an inclusive minimum value of zero and an exclusive maximum value of infinity (or the equivalent maximum value of the primitive type used to represent the maximum value of the range), and the bounding range is added to the associated work item 432 for the root node.

In one embodiment, the bounding range determined for the parent node is used, along with the key values of the node, to calculated bounding ranges for each of the child nodes. In one embodiment, where the hierarchical data structure is a B-tree, if the root node (having a bounding range from zero (inclusive) to infinity (exclusive), a "leftmost" child node depending from that tree inherits a bounding range of zero (inclusive) to the lowest key value within the parent node (exclusive) (e.g., work item 434, illustrating a range of zero to 6; similarly, work item 438, illustrating a range of zero to 2). Likewise, the "rightmost" child inherits a bounding range corresponding to the largest key value in the parent node (inclusive minimum) to infinity (exclusive maximum) (e.g., work item 436, illustrating a range of 6 to infinity; similarly, work item 444 illustrating a range of 10 to infinity).

Additionally, any in-between child nodes inherit bounding ranges corresponding to the values of the intervening keys in a similar fashion (e.g., work item 440, illustrating a range of 3 to 6, and work item 442, illustrating a range of 6 to 9). In one embodiment, all bounding ranges are bounded by a minimum value that is inclusive and a maximum value that is exclusive (as illustratated), and adjacent child nodes depending from the same parent node effectively use the exclusive maximum value associated with the bounding range for the immediately leftward node as an inclusive minimum (and, accordingly, the inclusive minimum value associated with the bounding range for the immediately rightward node as the exclusive minimum). In one embodiment, as illustrated, these determined bounding ranges are added to the respective work item for the child node to which they apply.

Figure 5:
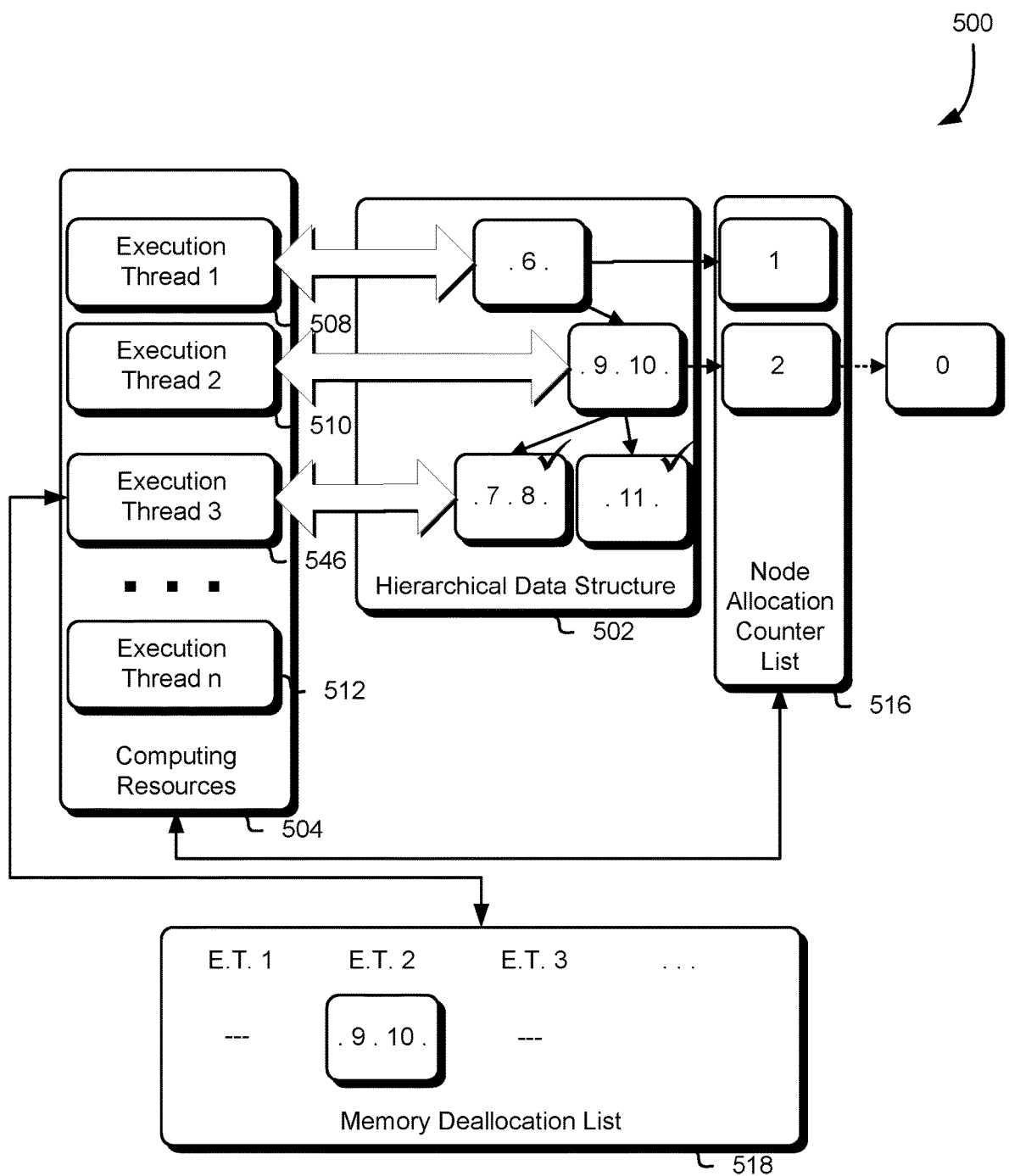
FIG. 5 illustrates an example implementation of memory allocation and deallocation tracking for verification of a hierarchical data structure using a node allocation counter list and a memory deallocation list, in accordance with one embodiment.

FIG. 5 illustrates an example implementation 500 of memory allocation and deallocation tracking for verification of a hierarchical data structure 502 using a node allocation counter list and a memory deallocation list, in accordance with one embodiment.

As previously mentioned, a verification engine implements, in one embodiment, a node allocation counter list 516 and a memory deallocation list 518 to more efficiently track dependencies between nodes and associated data held in memory during verification. During the verification process previously described, the data being verified for a given node is paged in to memory accessible to the execution thread performing the page-in and verification. In one embodiment, data associated with child nodes dependent therefrom also have dependencies on the data associated with the parent node. Accordingly, when a child node is being verified, data associated with its parent remains in memory until the child node data is evicted from memory (e.g., when verification is complete and no further child nodes have associated data also paged in).

In one embodiment, during the verification process, a given execution thread 508, 510 sets a counter to a value associated with the node being verified while verifying the data (e.g., placing it into memory). Also during processing of the node, the execution thread 508, 510 increments the counter for that node by one for each child node determined to depend directly therefrom. However, in one embodiment, an execution thread 546 does not track counters for leaf nodes (i.e., those without children).

When the verification of the node data for a non-leaf node is complete, the counter for that node is decremented by one by the execution thread performing the verification. Similarly, when verification of each child node dependent therefrom is complete, the counter for the parent node is also decremented by one by the execution thread performing the processing of the child node. When any given counter reaches zero, the execution thread last responsible for decrementing that node's counter to zero flags the associated node data for eviction from memory by the execution thread that originally paged it into memory. The various counters for the nodes are tracked and maintained by the node allocation counter list 516, as previously described. Similarly, nodes flagged for eviction from memory are tracked in the memory deallocation list.

As illustrated, execution thread 546 has completed verification of nodes "7 8" and "11," and accordingly has decremented the counter for node "9 10" from two to zero. As such, execution thread 546 corresponding flags node "9 10" for eviction for memory by the execution thread that original paged it in (i.e., execution thread 510). However, as node "9 10" has not yet been evicted from memory by execution thread 510, the counter for node "9 10"'s parent, "6", remains at 1, and thus the associated data for node "6" remains in memory until such as time as node "9 10" is evicted. In one embodiment, the counters may decremented upon flagging, rather than upon actual eviction. In that circumstance, the counter for "6" would also be 0 and, thus, be flagged for eviction by execution thread 508.

In one embodiment, each execution thread 508, 510, 546, 512, executing within computing resources 504, tracks its own respective counter, which tracks the quantity of node-related data objects have been paged into the memory by and for the respective execution thread. Each aforementioned counter is thread-local for the associated execution thread, in the sense that the execution thread need not acquire a lock to, e.g., the memory deallocation list 518, to examine which and/or how many respective data objects/pages are presently paged into memory (as it can simply do so by looking at its own counter). When a given execution thread pages in the data object into memory, the thread-local counter for that execution thread increments by 1 and, likewise, when the object is removed from (paged out of) the memory, the counter decrements by 1.

In one embodiment, when a given execution thread 508, 510, 546, 512 is instructed to page node-related data into memory, it first retrieves the value of its thread-local counter and compares the value against a threshold. The threshold may be predetermined and/or adaptive (e.g., computed relative to memory residence time, capacity, and/or occupancy), and may be set and/or computed on a global basis (across all threads), grouped basis (across subsets of the threads), or a per-thread basis. In one embodiment, to the extent that the thread local counter is below the threshold, the thread continues to page the data into memory. If the counter is equal to or above the threshold, the respective execution thread queries the memory deallocation list 518 and removes all node-related data in the list 518 which it originally paged in and, thereafter, continues on to paging in the requested data into memory.

In one embodiment, when a given execution thread 508, 510, 546, 512 is idle, it alternates between querying the memory deallocation list 518 to determine whether any associated pages are ready for removal from memory and retrieving a work unit from the work unit queue for processing.

As may be contemplated, for multiple levels of child nodes, data associated with a higher level child node (or root node, for that matter) will remain in memory until all directly and indirectly dependent child nodes below it have been verified. As such, the verification techniques previously mentioned, by virtue of increasing the locality of node verification over time for a given set of execution threads, the length of time the higher level node data stays paged in decreases commensurately. This benefit is compounded by the overall improvement, relative to existing multithreaded techniques, in speed, efficiency, and parallelism of verifying hierarchical data structures using the described techniques.

Figure 6:
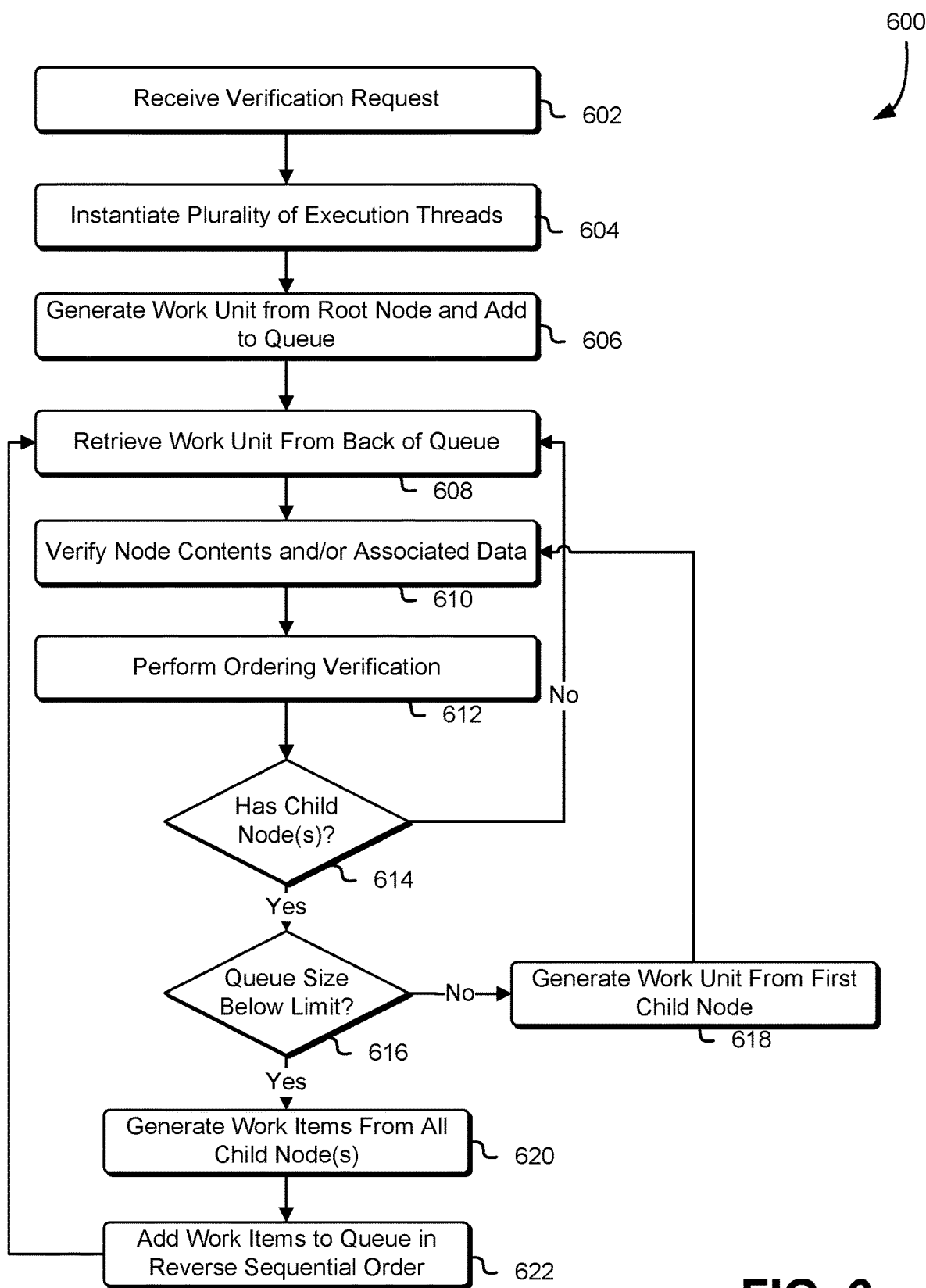
FIG. 6 illustrates an example process for enqueuing work items associated with nodes of a hierarchical data structure using a plurality of execution threads, in accordance with one embodiment.

FIG. 6 illustrates an example process for enqueuing work items associated with nodes of a hierarchical data structure using a plurality of execution threads, in accordance with one embodiment.

At step 602, an entity, such as an interface of a database management service as previously described in connection with at least FIGS. 1-2, receives a verification request. The request may be programmatic or through a user interface, and, in one embodiment, is initiated via an automated or manual process. In response to this request, at step 604, an entity, such as a verification engine as previously described in connection with at least FIGS. 1-5, instantiates, or causes instantiation of, a plurality of execution threads having access to a pool of computer resources, such as processors and memory, so as to cause one or more of the threads to begin the verification process at step 606 by generating a work unit from the root node of the hierarchical data structure being verified and adding that work unit to a work queue implemented by the verification engine.

Starting at step 608, an iterative, multi-threaded verification process begins. An available execution thread retrieves a work unit from the back of the queue, and at step 610, verifies the node contents and/or the data associated therewith according to techniques described in detail at least in connection with FIG. 3 above. Furthermore, at step 612, the thread performs an ordering verification 612, as described in greater detail in connection with FIGS. 1-4 above and FIG. 7 below, at least by comparing the key values within the node against a bounding range determined for the node.

At decision point 614, the execution thread determines whether the node being processed is the parent of any child nodes 614. If not, the thread terminates with respect to that node and returns to step 608 to retrieve a different work unit for processing. However, if at decision point 614 the execution thread determines that the node does have children, the execution thread further determines at decision point 616 whether or not the work item queue has enough remaining space to accommodate all work items to be generated from the child nodes. If not, at step 618 the execution thread generates a work unit from the sequentially (by key value within the node) first child node, and performs the iterative verification steps on that node starting at step 610. It may be contemplated that, if the queue remains full but further levels of children are iteratively discovered for each child being processed (e.g., starting at step 618), a local "cache" of work items for a given execution thread may continue to build up. In one embodiment, the execution thread retries addition of previously unenqueued batches of work items, and re-performing the inquiry at decision point 616 with each successfully added "back" batch.

At step 620, to the extent that the queue is determined at decision point 616 as having sufficient capacity to add all of the work items generated for the presently processed node, the work items are generated by the execution thread and, at step 622, the generated work items are added to the queue in reverse sequential order of the keys for the corresponding nodes. The execution thread then terminates, and retrieves a new work unit from the back of the queue at step 608.

Figure 7:
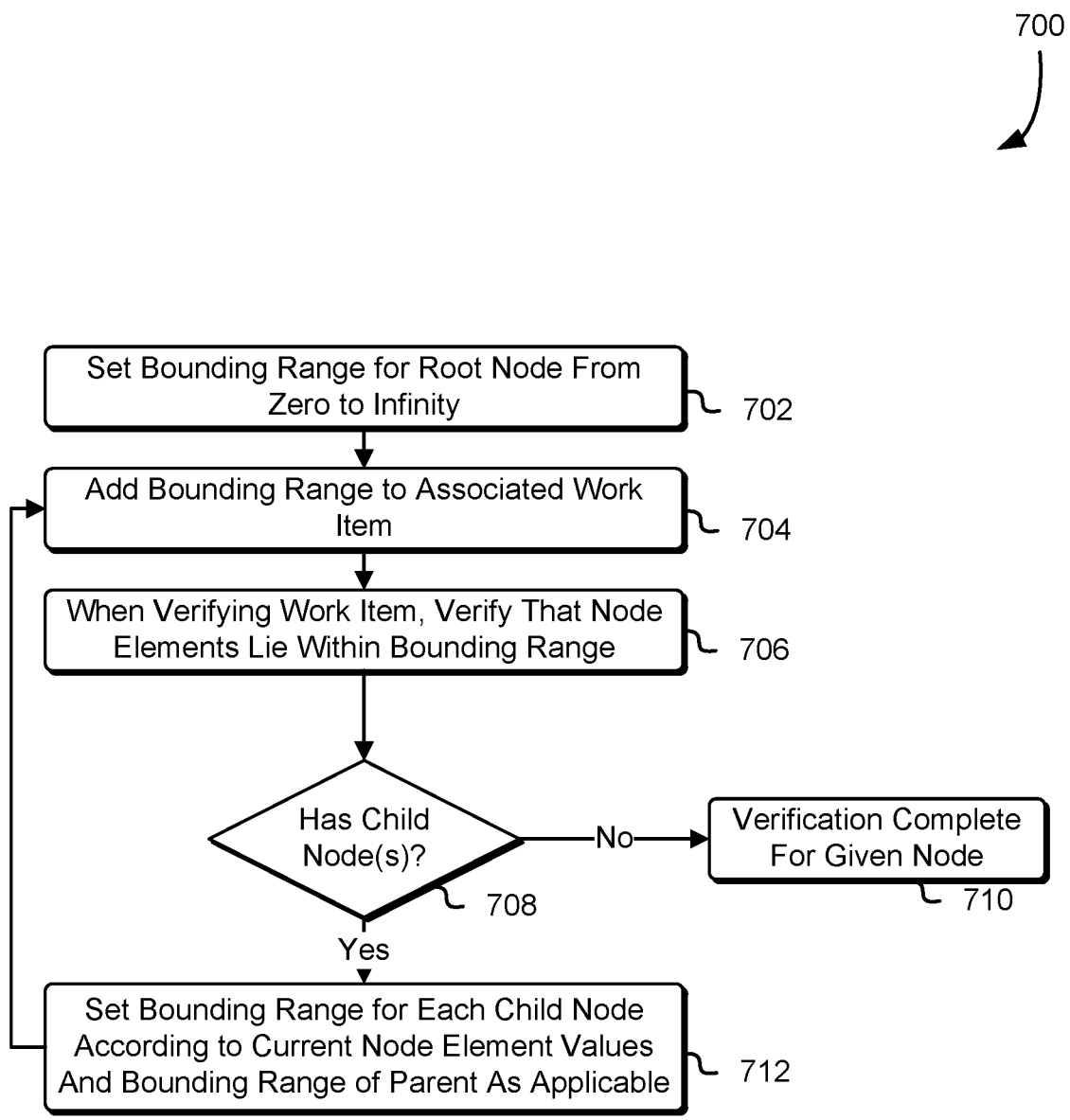
FIG. 7 illustrates an example process for determining bounding ranges for verifying a hierarchical data structure, in accordance with one embodiment.

FIG. 7 illustrates an example process for determining bounding ranges for verifying a hierarchical data structure, in accordance with one embodiment.

At step 702, as described in further detail in connection with FIG. 4 above, as part of the verification process for a given node, an execution thread determines the bounding range for keys in a root node of a hierarchical data structure to be an inclusive minimum of zero and an exclusive maximum of infinity. At step 704, the process begins iterating by adding the determined bounding range to the work item to which it applies (in the case of entering step 704 from step 702, the root node work item). At step 706, as part of the verification process, the execution thread verifies whether the node key values are properly sorted (e.g., in sequential order) and all lie within the determined bounding range.

At decision point 708, also as part of the verification process as previously described, the execution thread determines whether the node under examination has any child nodes. If not, the node is a leaf node and the thread terminates for that node at step 710. However, if at decision point 708, one or more child nodes are determined, the bounding ranges for each of the child nodes is passed down at step 712 from the parent presently being processed, using the bounding range determined for the parent and the values of the key element(s) within the parents as bounds for the children dependent therefrom, depending on the node position of the children, according to techniques described in at least FIG. 4 above. The process then iterates back to step 704 (e.g., adding the determined bounding ranges to the children work items to which they apply).

Figure 8:
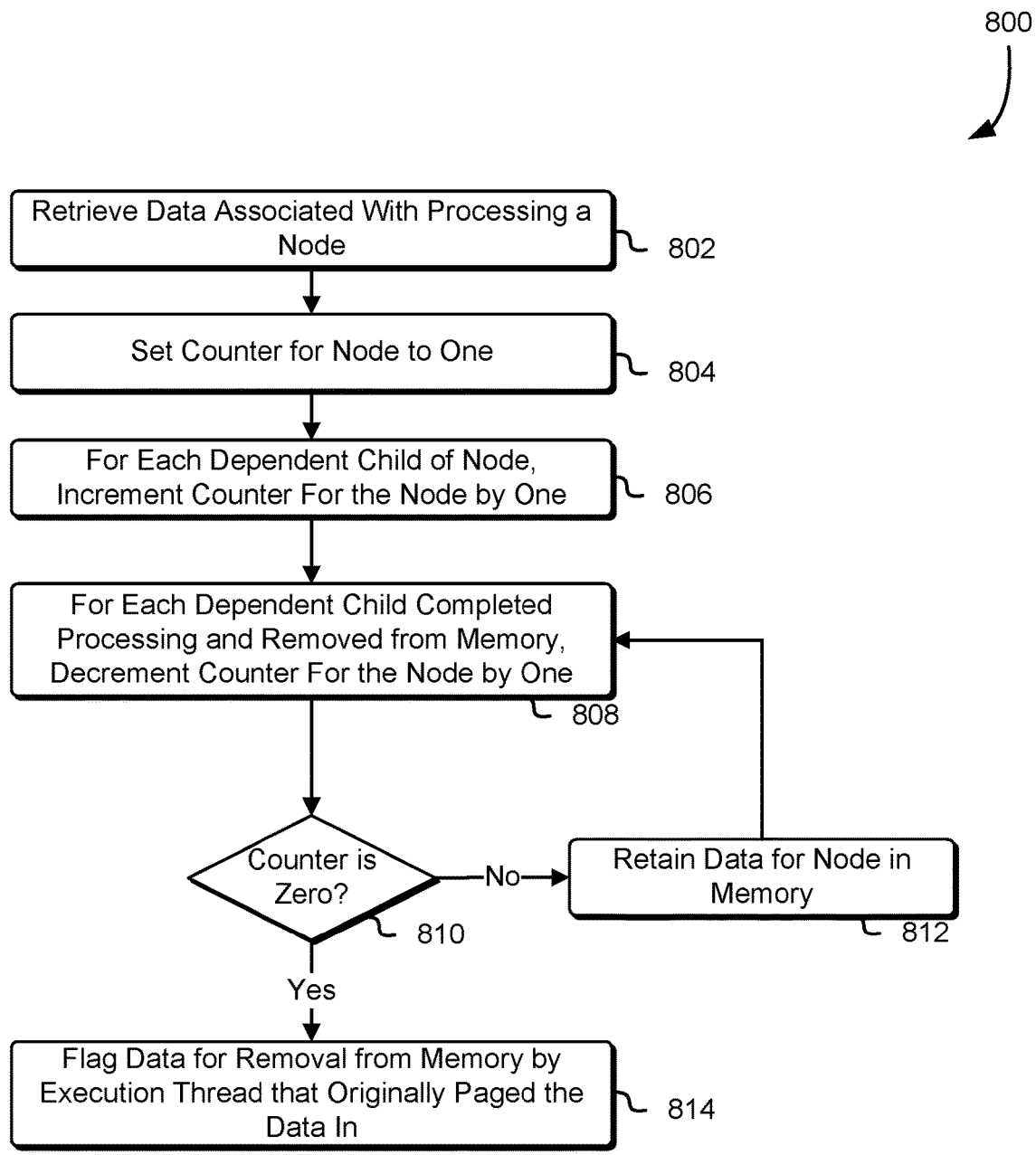
FIG. 8 illustrates an example process for tracking node data for allocation and deallocation from memory during a verification process, in accordance with one embodiment.

FIG. 8 illustrates an example process for tracking node data for allocation and deallocation from memory during a verification process, in accordance with one embodiment.

At step 802, during the verification process, data to be verified is retrieved by the associated execution thread and paged into a memory associated with the execution thread. In response to this action, the execution thread sets a counter associated with the associated node to a value of 1 (e.g., in a node allocation counter list) at step 804.

As the verification process continues, as each child of that node is discovered at step 806, the counter for the node is incremented by one. At step 808, as those children are processed, verified, and removed from the respective memory of the execution threads processing them, those execution threads decrement the counter of the parent node by one for each child node completed and paged out. At decision point 810, if the node counter reaches zero, at step 814, the data associated with that node is flagged for page-out by the thread that originally paged the data in. However, if the node counter remains above zero, the parent node's data remains in memory at 812 and other verification processes continue.

Where the node counter for a given thread reaches zero and the associated page is added to the memory deallocation list at step 814, that page is processed for removal from memory by the relevant thread according to one or more techniques described in connection with FIG. 5. As previously described, in one embodiment, the thread tracks its own counter to determine how many data objects are paged into memory for that thread, and once that counter reaches and/or exceeds a threshold, the thread processes the memory deallocation list to determine which pages to deallocate. Additionally, also as previously described, when the thread is idle, it queries the aforementioned list to determine whether and/or which pages are eligible for deallocation, and performs deallocation of those pages.

Figure 9:
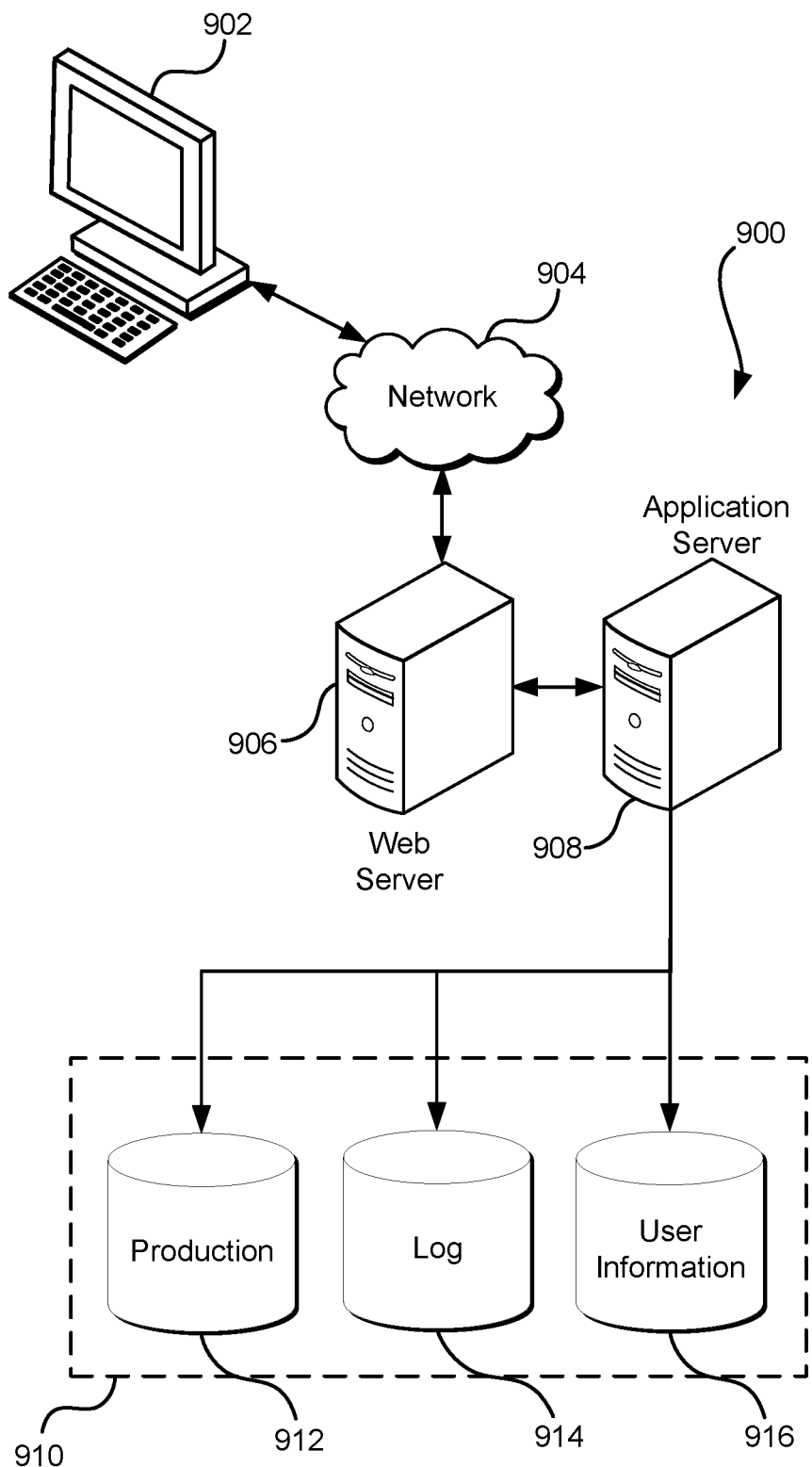
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle °, Microsoft °, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser.

In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    verifying a hierarchical data structure comprising a plurality of nodes by at least:
        generating, by an execution thread, a first work unit associated with a root node of the plurality of nodes, the first work unit containing a first entirety of data in the root node;
        storing, by the execution thread, the first work unit in a queue associated with a size limit;
        using the execution thread to at least:
            retrieve the first work unit from the queue;
            verify a first data object associated with a first key corresponding to the root node by at least verifying integrity of a relationship between the first key and the first data object;
            identify a first child node depending from the root node;
            generate a second work unit associated with the first child node, the second work unit including a second entirety of data in the first child node; and
            store, in the queue, the second work unit; and
        using a different execution thread to at least:
            retrieve the second work unit from the queue;
            verify a second data object associated with a second key corresponding to the first child node;
            identify a second child node depending from the first child node; and
            as a result of determining that the current size of the queue plus a size of a third work unit to be generated from the second entirety of data in the second child node exceeds the size limit, verify, by the different execution thread, the second child node.

2. The computer-implemented method of claim 1, wherein the different execution thread is further used to at least:

identify a plurality of child nodes depending from the first child node, the second child node being part of the plurality of child nodes; and as a result of determining that the current size of the queue plus a cumulative size of a plurality of work units to be generated from the plurality of child nodes is less than or equal to the size limit, at least:

generate the plurality of work units from the plurality of child nodes, the third work unit being part of the plurality of work units; and store the plurality of work units in the queue in a sequentially reverse order according to respective key values of the associated plurality of child nodes.

3. The computer-implemented method of claim 2, further comprising, as a result of determining that the current size of the queue plus the cumulative size of the plurality of work units is greater than the size limit, verifying a child node of the plurality of child nodes before reattempting an enqueuing of a remainder of the plurality of child nodes.

4. The computer-implemented method of claim 1, wherein:

the execution thread is further used to at least:
determine a first verification range for the root node, the first verification range bounded by zero as an inclusive minimum and infinity as an exclusive maximum;
verify that values of all keys within the root node are within the first verification range;
determine a second verification range for the first child node, the second verification range bounded by an inclusive minimum corresponding to the inclusive minimum of the first verification range and an exclusive maximum corresponding to a value of the first key; and
further generate the second work unit by including the second verification range in the second work unit; and the different execution thread is further used to at least:
verify that values of all keys within the first child node are within the second verification range; and
determine a third verification range for the second child node, the third verification range bounded by an inclusive minimum corresponding to the inclusive minimum of the second verification range and an exclusive maximum corresponding to a value of the second key.

5. The computer-implemented method of claim 1, wherein the first data object is held in memory by the execution thread while the different execution thread is performing operations associated with the second data object.

6. The computer-implemented method of claim 5, further comprising:

incrementing a first counter associated with the second data object when the second data object is initialized in the memory;
determining a first quantity of work units corresponding to a first plurality of child nodes depending from the first child node, the first plurality of child nodes including the second child node;
further incrementing the first counter by the first quantity;
incrementing a second counter associated with the second child node when a third data object associated with the second child node is initialized in the memory;
determining a second quantity of work units corresponding to a second plurality of child nodes depending from the second child node;
further incrementing the second counter by the second quantity;
decrementing the second counter by one when a data object associated with [ ] a child node in the second plurality of child nodes is removed from the memory;
removing the third data object from the memory when the second counter has a value of zero;
decrementing the first counter by one when a data object associated with a child node in the first plurality of child nodes is removed from the memory; and
removing the second data object from the memory when the first counter has a value of zero.

7. The computer-implemented method of claim 5, further comprising:

associating the first data object with the execution thread while the first data object is held in the memory;
flagging, by the different execution thread, the second data object for removal from the memory based at least in part on an absence in the memory of other data objects corresponding to child nodes depending from the root node; and
causing the execution thread to remove the first data object from the memory based at least in part on the associating and the flagging.

8. A system, comprising:

memory to store computer-readable instructions which, if performed by one or more processors, cause the system to:
generate, by a first execution thread having access to the one or more processors and the memory, a first work unit associated with a root node of a plurality of nodes arranged in a hierarchical data structure, the first work unit containing a first entirety of data in the root node;
store, by the first execution thread, the first work unit in a queue having a size limit;
use the first execution thread to at least:
retrieve the first work unit from the queue;
verify data associated with a first key corresponding to the root node;
identify a plurality of child nodes depending from the root node;
generate a plurality of work units, wherein each work unit of the plurality of work units is associated with a respective child node of the plurality of child nodes and contains a second entirety of data in the respective child node; and
as a result of determining that a work unit of the plurality of work units plus a current size of the queue exceeds the size limit, cause the system to use the first execution thread to verify the work unit.

9. The system of claim 8, wherein the instructions, if performed, further cause the system to at least:

use a second execution thread to at least:
identify a second work unit of the plurality of work units, the second work unit being at a frontmost position of the queue;
retrieve the second work unit from the queue;
verify data corresponding to second key associated with the second work unit;
identify a different child node depending from a child node associated with the second work unit;
determine whether a current size of the queue plus a size of a third work unit to be generated from the different child node is less than the size limit; and
as a result of determining that the current size of the queue plus the size of the third work unit is less than or equal to the size limit, at least:

generate the third work unit from the different child node; and store the third work unit in the queue.

10. The system of claim 9, wherein:

the third work unit is of a second plurality of work units corresponding to other child nodes depending from the child node; and the instructions, if performed, further cause the system to reattempt storage of a reminder of the second plurality of work units other than the third work unit.

11. The system of claim 8, wherein the instructions that, if performed, cause the system to store the plurality of work units further cause the system to store the plurality of work units in a reverse sequential order of respective keys associated with respective work units of the plurality of work units.

12. The system of claim 8, wherein the data is a data object corresponding to the first key, the data object being stored in a separate data structure from the hierarchical data structure.

13. A non-transitory computer-readable storage medium having stored thereon executable instructions that, as a result of being executed by one or more processors of a computer system, cause the computer system to at least:

generate, by a first execution thread having access to the one or more processors and a memory of the computer system, a first work unit associated with a root node of a plurality of nodes arranged in a hierarchical data structure, the first work unit containing a first entirety of data in the root node;

store, by the first execution thread, the first work unit in a queue having a size limit;

use the first execution thread to at least:

retrieve the first work unit from the queue;

verify data associated with a first key corresponding to the root node;

identify a plurality of child nodes depending from the root node;

generate a plurality of work units, wherein each work unit of the plurality of work units is associated with a respective child node of the plurality of child nodes and contains a second entirety of data in the respective child node; and as a result of determining that a current size of the queue plus a work unit of the plurality of work units exceeds the size limit, cause the computer system to use the first execution thread to verify the work unit.

14. The non-transitory computer-readable storage medium of claim 13, wherein the instructions further cause the computer system to use a second execution thread to at least:

identify a second work unit of the plurality of work units, the second work unit being at a frontmost position of the queue;

retrieve the second work unit from the queue;

verify data corresponding to second key associated with the second work unit;

identify whether the child node associated with the second work unit is a leaf node; and as a result of identifying that the child node is a leaf node, terminate processing of the second work unit.

15. The non-transitory computer-readable storage medium of claim 13, wherein the hierarchical data structure is a B-tree.

16. The non-transitory computer-readable storage medium of claim 13, wherein the hierarchical data structure is implemented by a database management system associated with the computer system.

17. The non-transitory computer-readable storage medium of claim 16, wherein the hierarchical data structure is implemented to represent data stored by the database management system on a data storage system separate from the computer system.

18. The non-transitory computer-readable storage medium of claim 13, wherein the instructions further cause the computer system to generate the first work unit in response to a verification request associated with the hierarchical data structure.

19. The computer-implemented method of claim 1, further comprising, as a result of determining that the current size of the queue plus a size of a third work unit to be generated from a third entirety of data in the second child node is less than the size limit, at least:

generate the third work unit containing a third entirety of the data from the second child node; and store the third work unit in the queue.

20. The computer-implemented method of claim 1, further comprising:

further using the execution thread to:

determine a first verification range for the first child node, the first verification range bounded by an inclusive minimum of a parent node's verification range and an exclusive maximum corresponding to a value of the first key; and verify the first child node using the first verification range; and further using the different execution thread to:

determine a second verification range for the second child node, the second verification range bounded by an inclusive minimum corresponding to the inclusive minimum value of the first key and an exclusive maximum corresponding to a value of the second key; and verify the second child node using the second verification range.

* * * * *